April 8, 1930.  W. F. HEROLD  1,753,431
CASTER
Filed Feb. 14, 1929
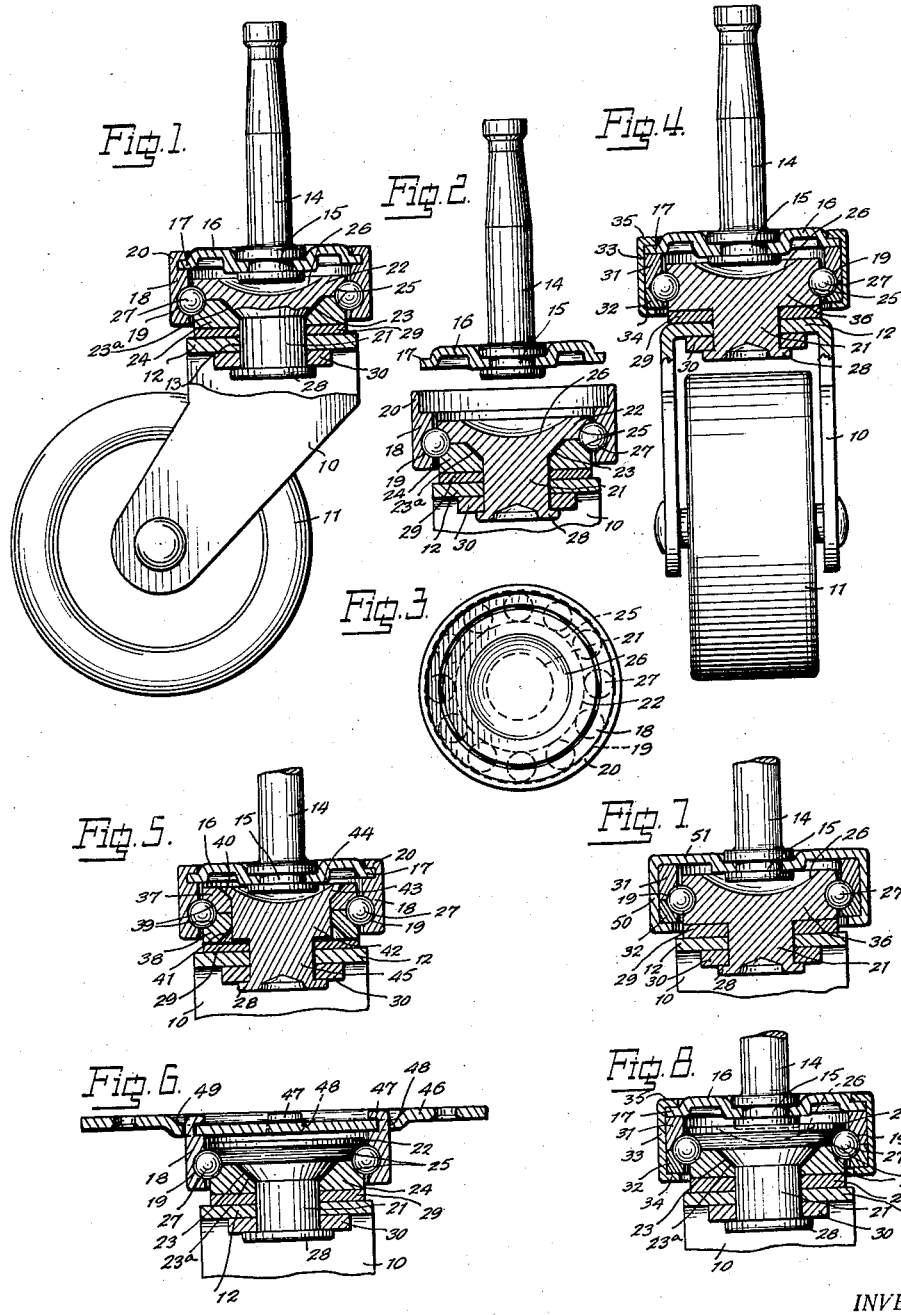
INVENTOR.
WALTER F. HEROLD.
BY
ATTORNEY.

Patented Apr. 8, 1930

1,753,431

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed February 14, 1929. Serial No. 339,802.

The present invention relates to casters, particularly of the ball-bearing swivel type, and has for an object to provide a caster having a high degree of efficiency in the use, and which at the same time will be relatively inexpensive and simple in construction.

An object is to provide in a caster a ball bearing unit having a single ball race which will be double acting to serve both as a thrust and journal bearing, and which will at the same time provide a positive and easy-swiveling two-directional thrust bearing for the load, imposed through the offset of the caster upwardly at one side and downwardly at the other side of the swiveling axis.

Another object is to provide a construction in which a ball-bearing unit is adapted to be assembled with the caster horn and the pintle, or other attaching means, in such manner that a single type of bearing unit may be utilized with various types and sizes of horns and attaching means.

It is particularly proposed to provide a ball-bearing unit which is completely assembled independently of the caster attaching means, so that its assembly does not depend upon any particular size or shape of the attaching means, and whereby the latter may be rigidly secured simply by connecting it to a portion of the bearing unit, as by bending or swaging one with respect to the other, and without regard to the size or shape of the attaching means. A standardized bearing unit may thus be employed and a complete assortment of caster sizes and styles built around it, thereby greatly simplifying and economizing manufacture.

A further object is to provide a bearing unit in which there are no threaded parts, and further to provide a complete caster assembly in which the parts are assembled with respect to the bearing unit by bending or swaging, and without the necessity for threaded parts.

With the above and other objects in view, embodiments of the invention are shown in the accompanying drawings, and these embodiments will be hereinafter more fully described with reference thereto, and the invention will be finally pointed out in the claims.

In the drawings:—

Fig. 1 is a vertical sectional view, partly in side elevation, of a caster according to the present embodiment of the invention.

Fig. 2 is a view showing the bearing unit in section, and before assembly, and the horn and pintle in separated relation.

Fig. 3 is a plan view of the bearing unit, as shown in Fig. 2.

Fig. 4 is a vertical sectional view, partly in elevation of a slightly modified form of the invention.

Figs. 5 to 8 are sectional views, partially broken away, showing four further modified forms of the invention.

Similar reference characters indicate corresponding parts throughout the several figures of the drawings.

Referring to the drawings, the caster comprises a horn 10, in which the wheel 11 is mounted, and provided in its upper flat portion 12 with an aperture 13, as usually provided for receiving the pintle. The pintle 14 has its stud end 15 secured in an apertured base plate 16, having a downwardly offset marginal edge portion 17. According to the present embodiments of the invention the ball-bearing unit, which constitutes a complete assembly independent of the horn and attaching means, is adapted to have its inner rotatable ball-race member secured at its under side to the horn, and its outer ball-race member secured at its upper side to the base plate of the pintle or other attaching means.

The ball-bearing unit comprises an outer ring 18 having a ball-race 19, of semi-circular cross-section, formed upon its inner surface, and at its upper surface adjacent the outer edge is provided with an upstanding flange 20, having an inner circumference adapted to permit the base 16 to fit therein.

The inner member of the bearing comprises a center stud 21 having a laterally extending flange 22 at its upper end and a beveled surface 23 between the under surface of the flange and the cylindrical surface of the stud. A ring 24 having a beveled surface 23ª is fitted upon the stud beneath the flange 22, and the ring and flange are grooved at their outer peripheral surface to provide a ball-race 25 of semi-circular cross-section. The stud is recessed at its upper surface, as at 26, to receive the headed over lower end of the pintle, as will presently more fully appear. The balls 27 are interposed between the ball-races, being inserted before assembly of the ring 24.

The ball-bearing unit is first assembled to the horn by engaging the stud 21 in the aperture 13 of the horn and heading it over, as at 28, a washer 29 being interposed between the lower side of the central or rotary part of the bearing and the top of the horn, and another washer 30 being interposed between the bottom surface of the horn and the headed over end 28. Before assembly of the base plate of the pintle the top of the bearing unit is open, as shown in Fig. 2, so that the inner member of the bearing unit may be solidly supported during the assembly of the horn and the heading over of the end 28.

The pintle is next assembled to the outer ring 18 by engaging the base plate 16 within the flange 20, and bending the latter over upon the margin of the plate, as shown in Fig. 1, the projecting flat under surface of the ring providing a suitable support during this operation. This sequence of assembly not only facilitates the assembly of the horn and attaching means, but relieves the balls of any strain during the bending or swaging operations.

In Fig. 4 I have shown a modified form of the invention, in which the outer ring is made up of two half-sections 31 and 32, disposed within a cup member 33, flanged over at its lower edge, as at 34, and adapted to be flanged over at its upper edge, as at 35, to secure the base plate 16, and at the same time secure the assembled relation of the rings. In this embodiment I have shown an inner ball race member 36 having an external shape corresponding to the two-part inner ball race shown in Fig. 1, but formed of one piece, the two-part form of the outer race permitting the assembly of the balls.

In Fig. 5 I have shown another embodiment of the invention, in which a modified form of inner ball-race member is provided, the outer member being similar to that shown in Fig. 1. This inner member is formed of two similar half-section rings 37 and 38, grooved at their outer sides to provide a ball-race 39 a semi-circular cross-section, and beveled at their inner sides, as at 40 and 41. The two rings are assembled by means of a center stud 42, engaged within the openings of the rings and provided at its upper end with a beveled flange 43, seated upon the beveled surface 40 of the upper ring, the stud being recessed at its upper surface, as at 44, to receive the headed over lower end of the pintle, and being provided at its lower end with a projecting post 45, for engagement in the aperture of the horn, which is secured in the same manner as the first form.

In Fig. 6 I have shown a modified form in which the attaching means consists of a plate 46 adapted to be screwed to the furniture. In this form the ring forming the outer ball-race is provided at its upper end with a series of upstanding lugs 47, which are engaged with slots 48 in the plate, and are bent over upon the upper surface thereof to thereby secure it. The plate is preferably dished, as at 49, so that its upper flat surface is above the plane of the bent over lugs. The inner member of the bearing is similar to that shown in Fig. 1.

In Fig. 7 I have shown a modification somewhat similar to that shown in Fig. 4, but in this form the cup for securing the outer race forming rings together is formed as an integral extension 50 of the base plate 51, to which the pintle is secured.

In Fig. 8 I have shown a modification in which the outer race forming member is similar to that shown in Fig. 4, while the inner race forming member is similar to that shown in Fig. 1. It will be understood that any of the several forms of inner race forming members, as shown respectively in Figs. 1, 4 and 5, may be employed with any of the several forms of outer race forming members.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:—

1. In a caster, a floor engaging element, an attaching element, and a ball-bearing assembly unit including relatively rotatable inner and outer ball-race members and antifriction balls between them, means carried by said inner ball-race member adapted to be secured to said floor engaging element, and means carried by said outer ball-race member adapted to be secured to said attaching element.

2. In a caster, a floor engaging element, having an aperture in its upper portion, an attaching element, and a ball-bearing assembly unit including inner and outer relatively rotatable members and antifriction balls between them, a central downwardly extending stud carried by said inner rotatable member adapted to be engaged in said aperture of the floor engaging element and secured thereto, and means carried by the outer rotatable member adapted to be secured to said attaching element.

3. In a caster, a floor engaging element, an attaching element including a base plate, and a ball-bearing assembly unit including relatively rotatable inner and outer ball-race members and antifriction balls between them, means carried by said inner ball-race member adapted to be secured to said floor engaging element, and a flange carried by said outer ball-race member adapted to be bent upon and secured to said base plate of the attaching element.

4. In a caster, a floor engaging element, an attaching element including a pintle and a laterally extending base plate secured thereto, and a ball-bearing assembly unit including relatively rotatable inner and outer ball-race members and antifriction balls between them, means carried by said inner ball-race member adapted to be secured to said floor engaging element, and a flange carried by said outer ball-race member adapted to be bent upon and secured to said base plate of the attaching element.

5. In a caster, a floor engaging element, an attaching element, and a ball-bearing assembly unit including relatively rotatable inner and outer ball-race members and antifriction balls between them, one of said members consisting of upper and lower half-sections, each forming a portion of a ball-race, means for securing said half-sections in assembled relation, means carried by one of said rotatable members adapted to be secured to said floor engaging element, and means carried by the other rotatable member adapted to be secured to said attaching element.

6. In a caster, a floor engaging element, an attaching element, and a ball-bearing assembly unit including relatively rotatable inner and outer ball-race ring members and antifriction balls between them, said inner member consisting of upper and lower sections, each forming a portion of a ball-race, means securing said sections in assembled relation, means carried by one of said rotatable members adapted to be secured to said horn, and means carried by the other rotatable member adapted to be secured to said attaching element.

7. In a caster, a floor engaging element, an attaching element, and a ball-bearing assembly unit including relatively rotatable inner and outer ball-race ring members and antifriction balls between them, said inner member consisting of upper and lower ring members, each forming a portion of a ball-race, a central stud secured in the openings of said ring members and securing said members in assembled relation, means carried by one of said rotatable members adapted to be secured to said floor engaging element, and means carried by the other rotatable member adapted to be secured to said attaching element.

8. In a caster, a floor engaging element, an attaching element, and a ball-bearing assembly unit including relatively rotatable inner and outer ball-race members and antifriction balls between them, said outer member consisting of upper and lower half-sections, each forming a portion of a ball-race, a cup-member disposed about said half sections and securing them in assembled relation, means carried by one of said rotatable members adapted to be secured to said floor engaging element, and means carried by the other rotatable member adapted to be secured to said attaching element.

9. In a caster, a floor engaging element, an attaching element, and a ball-bearing assembly unit including relatively rotatable inner and outer ball-race members and antifriction balls between them, means carried by said inner ball-race member adapted to be secured to said floor engaging element, said inner member being exposed at its upper side in the unassembled relation of said attaching element, and means carried by said outer ball-race member adapted to be secured to said attaching element.

10. In a caster, a floor engaging element, an attaching element including a base plate, and a ball-bearing assembly unit including relatively rotatable inner and outer ball-race members and antifriction balls between them, means carried by said inner ball-race member adapted to be secured to said floor engaging element, said inner member being exposed at its upper side in the unassembled relation of said attaching element, and means carried by said outer ball-race member adapted to be secured to said base plate of the attaching element whereby said base plate closes the upper side of said inner member.

Signed at Bridgeport, in the county of Fairfield, and State of Connecticut, this 8th day of February, 1929.

WALTER F. HEROLD.